(12) United States Patent
Cho et al.

(10) Patent No.: US 6,208,849 B1
(45) Date of Patent: Mar. 27, 2001

(54) RECEIVER WITH SUPPRESSED INTERMODULATION DISTORTION AND METHOD FOR OPERATING THE SAME

(75) Inventors: Seong-Won Cho, Seoul; Jae-Sun Park, Kyonggi-do; Hong-Gyu Kim, Kyonggi-do; Sung-Taek Kwon, Kyonggi-do, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/100,953

(22) Filed: Jun. 22, 1998

(30) Foreign Application Priority Data

Jun. 21, 1997 (KR) ................................................ 97-26369

(51) Int. Cl.$^7$ ...................................................... H04B 1/10
(52) U.S. Cl. ............................................. 455/296; 455/63
(58) Field of Search .......................... 455/232.1, 234.1, 455/336.1, 249.1, 250.1, 251.1, 253.2, 254, 295, 296, 302, 307, 308, 310, 311, 317, 226.3, 226.2, 63

(56) References Cited

U.S. PATENT DOCUMENTS

| | | |
|---|---|---|
| 5,001,776 | 3/1991 | Clark . |
| 5,170,392 | 12/1992 | Riordan . |
| 5,222,255 * | 6/1993 | Kuo et al. ............................. 455/295 |
| 5,239,683 * | 8/1993 | Usui ....................................... 455/63 |
| 5,339,454 * | 8/1994 | Kuo et al. ........................... 455/247.1 |
| 5,361,395 * | 11/1994 | Yamamoto ........................... 455/33.2 |
| 5,564,094 | 10/1996 | Anderson et al. . |
| 5,697,081 | 12/1997 | Lyall, Jr. et al. . |
| 5,758,271 | 5/1998 | Rich et al. . |
| 5,862,465 * | 1/1999 | Ou ..................................... 455/234.1 |
| 5,873,046 * | 2/1999 | Bronner ............................... 455/553 |
| 5,991,612 * | 11/1999 | Saito ................................. 455/234.1 |
| 6,011,980 * | 1/2000 | Nagano et al. ...................... 455/572 |
| 6,035,008 * | 3/2000 | Kim ...................................... 375/345 |
| 6,044,253 * | 3/2000 | Tsumura ............................. 455/234.1 |
| 6,052,566 * | 4/2000 | Abramsky et al. .................. 455/67.1 |

* cited by examiner

Primary Examiner—Reinhard Eisenzopf
Assistant Examiner—N. Mehrpour
(74) Attorney, Agent, or Firm—Robert E. Bushnell, Esq.

(57) ABSTRACT

A receiver with suppressed intermodulation distortion for a radio communication terminal. In the receiver, a low noise amplifier for amplifying a received signal, has an operating power being increased in response to a first control signal to reduce an intermodulation distortion signal. An RF bandpass filter bandpass-filters the signals in a reception frequency band out of the signals output from the low noise amplifier. A mixer mixes an output of the RF bandpass filter with a local oscillation signal to generate an intermediate frequency signal by down-converting the output of the RF bandpass filter. An intermediate frequency amplifier for amplifying the intermediate frequency signal output from the mixer, and having an operating power being increased to reduce the intermodulation distortion signal in response to a second control signal. An intermediate frequency bandpass filter bandpass-filters an intermediate frequency signal out of the signals output from the intermediate frequency amplifier. A demodulator and signal processor demodulates and processes the intermediate frequency signal output from the intermediate frequency bandpass filter to generate an received signal strength indicator signal and a signal-to-noise ratio signal. A controller having a reference received signal strength indicator signal and a reference signal-to-noise ratio signal stored therein, compares the received signal strength indicator signal and the signal-to-noise ratio signal with the reference received signal strength indicator signal and the reference signal-to-noise ratio signal to determine whether a reception sensitivity is poor, and activates said first and second control signals if the reception sensitivity is poor. And one or more attenuators are provided to be controlled by the controller in response to the further comparisons made between the generated signal-to-noise ratio signal and the reference signal-to-noise ratio signal.

18 Claims, 10 Drawing Sheets

RECEIVER WITH SUPPRESSED INTERMODULATION DISTORTION AND METHOD FOR OPERATING THE SAME

CLAIM OF PRIORITY

This application makes reference to, incorporates the same herein, and claims all benefits accruing under 35 U.S.C. §119 from an application entitled Receiver With Suppressed Intermodulation Distortion And Method For Operating The Same earlier filed in the Korean Industrial Property Office on Jun. 21, 1997, and there duly assigned Serial No. 97-26369 by that Office.

BACKGROUND OF THE INVENTION

1. Field of the Invention

The present invention relates to a receiver for a radio communication system, and in particular, to a receiver capable of suppressing intermodulation distortion signals and a method for operating the same.

2. Description of the Related Art

In a mobile communication terminal, an intermodulation distortion signal contained in a frequency band of a received RF (Radio Frequency) signal deteriorates a reception sensitivity. If the intermodulation distortion signal is greater in strength than the received RF signal, the receiver can barely detect the received signal, thus causing deterioration of the reception sensitivity. This intermodulation distortion problem is at issue in a radio communication terminal, especially, in an IS-95 dual mode (CDMA (Code Division Multiple Access) & AMPS (Advanced Mobile Phone Service)) cellular phone. For instance, in a mobile radio communication system such as a CDMA cellular system, undesired interferers (or interference signals) caused by the AMPS are intermodulated with each other, thereby generating a third order intermodulation distortion signal (i.e., the third harmonic intermodulation distortion signal). When the intermodulation distortion signal is considerably greater in strength than the CDMA signal, the reception sensitivity for the CDMA signal is lowered drastically. One process for improving the quality of a received signal in a radio receiver operating according the IS-95 standard is based on the combination of the received signal strength and signal-to-noise ratio, as contemplated by U.S Pat. No. 5,758,271 to Randall W. Rich et al. entitled Apparatus And Method for Optimizing The Quality Of A Received Signal In A Radio Receiver, incorporated herein by reference. U.S Pat. No. 5,697,081 to Robert L. Lyall, Jr. et al. entitled Intermodulation Distortion Reduction Circuit Utilizing Variable Attenuation contemplates a process wherein a variable attenuator, responsive to received signal strength in a receiver, provides variable attenuation to reduce intermodulation distortion according to an IS-98 standard. Reduction of intermodulation distortion is also contemplated by U.S. Pat. No. 5,564,094 to George C. Anderson et al. entitled Radio Receiver Providing Reduced Intermodulation Distortion; U.S. Pat. No. 5,001,776 to Edward T. Clark entitled Communication System With Adaptive Transceivers To Control Intermodulation Distortion; and U.S. Pat. No. 5,170,392 to Kenneth B. Riordan entitled Intermodulation Compensation In A Receiver.

SUMMARY OF THE INVENTION

It is therefore an object of the present invention to provide a receiver for use in a radio communication system, capable of preventing deterioration of the reception sensitivity due to the intermodulation distortion signals, and a method for operating the same.

It is another object of the present invention to provide a receiver for use in a radio communication system, having a low noise amplifier and an IF amplifier, wherein operating voltages and currents of the low noise amplifier and the IF amplifier are increased subsequently to enhance the reception sensitivity when the reception sensitivity is lowered due to the intermodulation distortion signals, and a method for operating the same.

It is still another object of the present invention to provide a receiver for use in a radio communication system, having a low noise amplifier, an IF amplifier, and an attenuator disposed between the low noise amplifier and the IF amplifier, wherein operating voltages and currents of the low noise amplifier and the IF amplifier are increased subsequently to enhance the reception sensitivity and then the attenuator is driven, when the reception sensitivity is lowered due to the intermodulation distortion signals, and a method for operating the same.

To achieve the above objects, there is provided a receiver with suppressed intermodulation distortion for a radio communication terminal. The receiver includes a low noise amplifier for low-noise-amplifying a received signal, an operating power thereof being increased to reduce an intermodulation distortion signal in response to a first control signal; an RF bandpass filter for bandpass-filtering signals in a reception frequency band out of the signals output from the low noise amplifier; a mixer for mixing an output of the RF bandpass filter with a local oscillation signal to generate an IF signal by down-converting the output of the RF bandpass filter; an IF amplifier for amplifying the IF signal output from the mixer, an operating power there of being increased to reduce the intermodulation distortion signal in response to a second control signal; an IF bandpass filter for bandpass-filtering an IF signal out of the signals output from the IF amplifier; a demodulator and signal processor for demodulating and processing the IF signal output from the IF bandpass filter to generate an RSSI signal and a signal-to-noise ratio signal; and a controller having a reference RSSI signal and a reference signal-to-noise ratio signal stored therein, for comparing the RSSI signal and the signal-to-noise ratio signal with the reference RSSI signal and the reference signal-to-noise ratio signal to determine whether a reception sensitivity is poor, and activating the first and second control signals if the reception sensitivity is poor.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
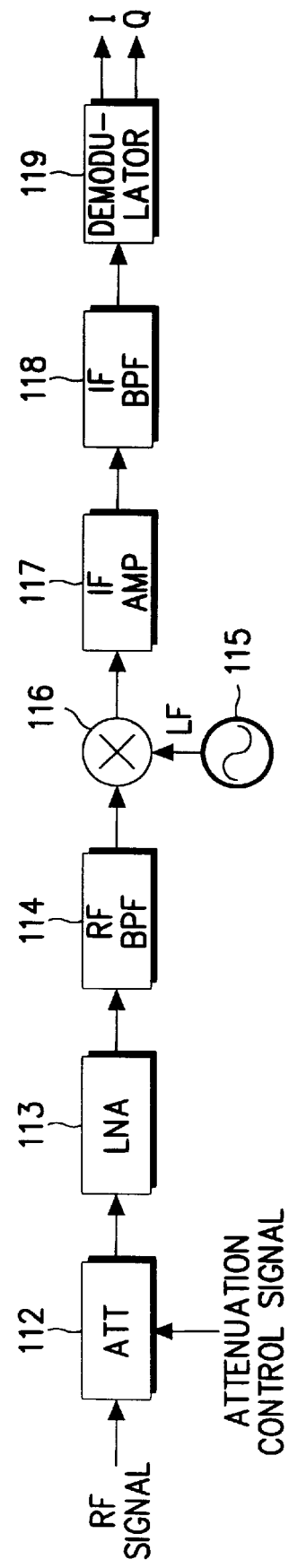
FIG. 1 is a block diagram of an exemplary receiver for a radio communication system, capable of suppressing the intermodulation distortion signals.

Reference will now be made to the preferred embodiments of the invention with reference to the accompanying drawings, in which similar reference numerals or symbols designate similar elements. Further, the descriptions of various configurations and components of the present invention which would have been known to one skilled in the art are omitted for the sake of clarity and brevity.

FIG. 1 shows a block diagram of an exemplary receiver for a radio communication system, which eliminates the intermodulation distortion signals using an attenuator (ATT) 112. The attenuator 112 attenuates the received RF signal, together with the intermodulation distortion signal contained therein. A low noise amplifier (LNA) 113 amplifies the weak RF signal output from the attenuator 112. An RF bandpass filter 114 filters the output signal of the low noise amplifier 113 to pass the signal in the reception frequency band only. A mixer 116 mixes the RF signal output from the RF bandpass filter 114 with a local oscillation signal LF output from a local oscillator 115, to generate intermediate frequencies $|RF \mp LF|$. An IF amplifier 117 amplifies the output of the mixer 116, and an IF bandpass filter 118 filters the output of the IF amplifier 117 to pass the intermediate frequency $|RF-LF|$ out of the intermediate frequencies $|RF \mp|$. The mixer 116 and the IF bandpass filter 118 co-operate to down-convert the RF signal to the IF signal. A demodulator 119 demodulates the IF output signal of the IF bandpass filter 118 to generate I and Q signals.

Figure 3:
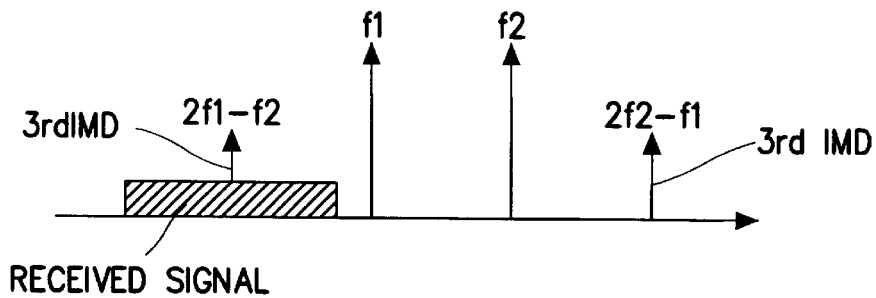
FIG. 3 is a diagram illustrating the intermodulation distortion characteristics in the receiver for the radio communication system.
Figure 4:
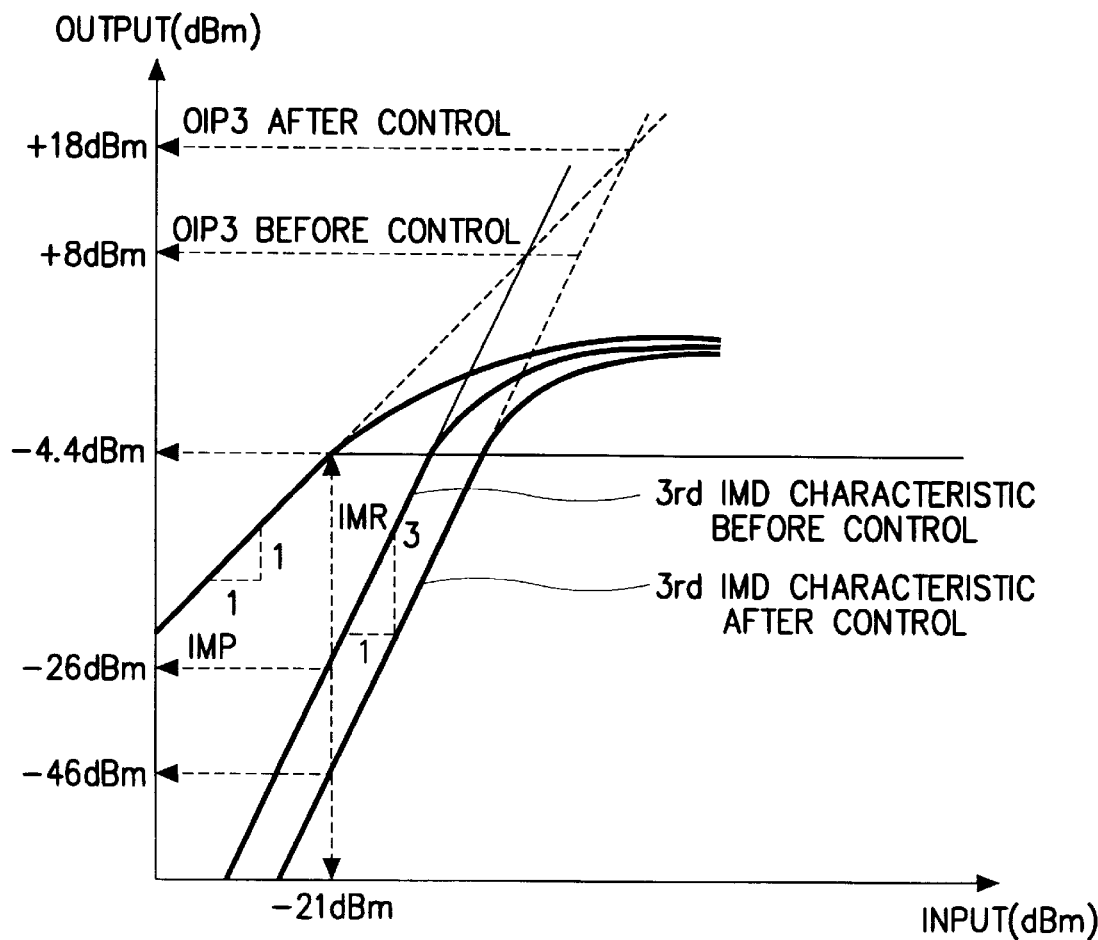
FIG. 4 is a diagram illustrating the intermodulation response characteristic curves in the receiver for the radio communication system.

FIG. 3 shows the intermodulation distortion characteristics and FIG. 4 shows the intermodulation response characteristics. Referring to FIG. 3, upon receipt of two tone interferers f1 and f2, an active element (e.g., a low nose amplifier in the receiver) generates the harmonics due to its nonlinear characteristic. That is, as illustrated, the active element generates the third harmonics 2f1-f2 and 2f2-f1 and other N-th harmonics as well as the two tone interferers f1 and f2. Among the various harmonics, the third harmonics 2f1-f2 and 2f2-f1 are present within the frequency band of the received RF signal, so that they function as the interference signals. Thus, as the third harmonic components are greater in strength, the reception sensitivity is lowered. The radio communication terminal, in particular, the IS-95 dual mode cellular phone, is susceptible to the intermodulation distortion signal.

FIG. 4 illustrates the intermodulation response characteristic curves representing the relationships between the third harmonic intermodulation distortion signal and the received signal in the receiver of FIG. 1. As illustrated, if the interferers f1 and f2 after passing the low noise amplifier 113 are about −4.4 dBm, the third harmonic intermodulation distortion signals 2f1-f2 and 2f2-f1 will become −26 dBm. Being present out of the reception frequency band, the interferers f1 and f2 are filtered out by the RF bandpass filter 114. However, the third harmonic intermodulation distortion signal 2f1-f2 being present within the reception frequency band can not be filtered out by the RF bandpass filter 114.

Here, as shown in FIG. 4, when the received signal increases by 1 dB, the third harmonic intermodulation distortion signal increases by 3 dB. Therefore, in order to reduce the third harmonic intermodulation distortion signal level, the received signal should be reduced in strength. Referring to the intermodulation distortion characteristic curve, if the received signal is attenuated by 10 dB, the third harmonic intermodulation distortion signal will be attenuated by 30 dB. In other words, the reduction rate of the intermodulation distortion signal is three time that of the received signal. Accordingly, if the received signal is attenuated, the receiver may be less affected by the intermodulation distortion signal.

However, though the exemplary method using the attenuator 112 in the front stage of the low noise amplifier 113 can reduce the third harmonic intermodulation distortion signal, it also attenuates the received signal, thereby leading to the low reception sensitivity.

Figure 2:
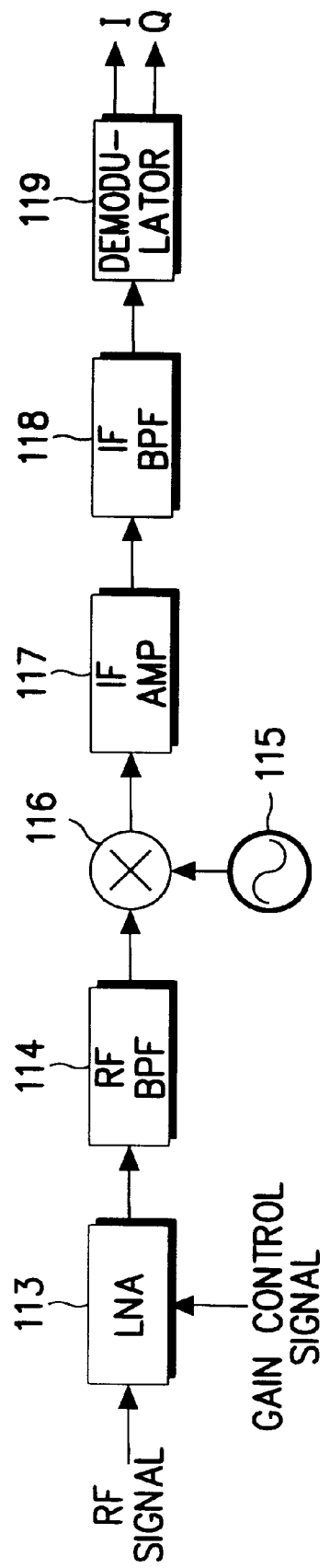
FIG. 2 is a block diagram of another exemplary receiver for a radio communication system, capable of suppressing the intermodulation distortion signals.

FIG. 2 illustrates a block diagram of another exemplary receiver for the radio communication system, in which the attenuator 112 of FIG. 1 is removed and the low noise amplifier 113 controls the gain of the received signal according to a gain control signal. By doing so, it is possible to eliminate the third harmonic intermodulation distortion signal. However, the receiver still cannot eliminate the third harmonic distortion signals caused by the other active elements, i.e., the mixer 116 and the IF amplifier 117 disposed in the front stage of the IF bandpass filter 118. Further, this receiver also reduces the gain of the received signal while reducing the intermodulation distortion signal, thus resulting in the lower reception sensitivity.

Figure 11:
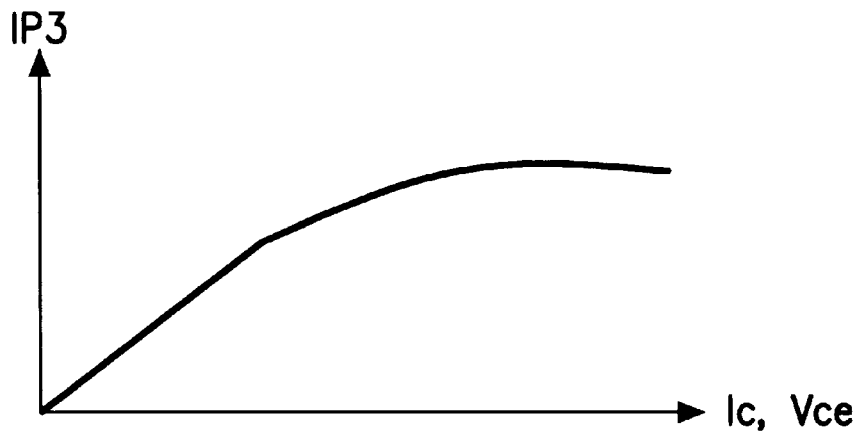
FIG. 11 is a diagram illustrating the third harmonic intermodulation distortion characteristic curve of a low noise amplifiers 113 of FIGS. 5, 7, and 9.
Figure 12:
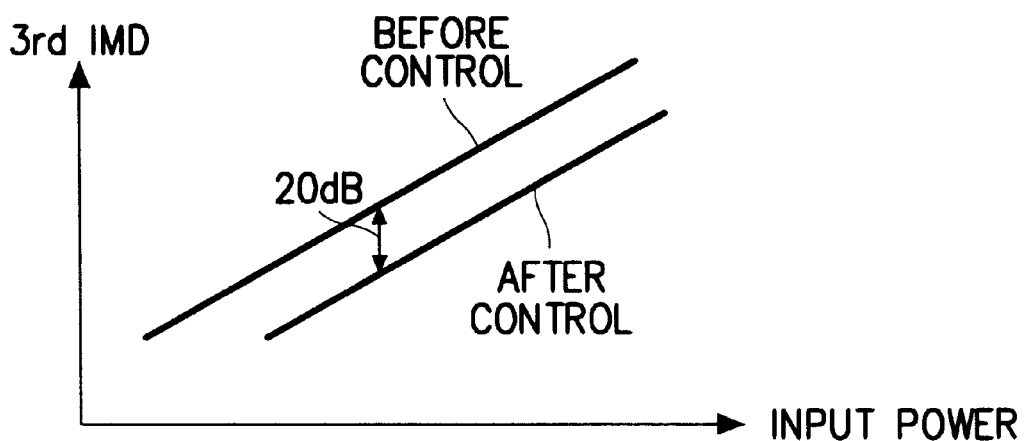
FIG. 12 is a diagram illustrating the third harmonic intermodulation distortion characteristic curve of the receivers shown in FIGS. 5, 7, and 9.

In a receiver for a radio communication system, an amplifier, such as a low noise amplifier, has the third harmonic intermodulation distortion characteristic curve as illustrated in FIG. 11, in which the intermodulation distortion signal increases in strength according to the increase of the voltage Vce and the current Ic supplied thereto. In a mobile communication terminal using a battery, the increase of the current consumption will inevitably reduce the serviceable duration of the battery, which causes the reduction of the communication time and the stand-by time of the communication terminal. Therefore, the present invention is directed to supplying the lower operating voltage and current to the amplifier in a normal condition, and increases the operating voltage and current when the reception sensitivity is lowered due to the intermodulation distortion signals, so as to minimize the influence of the intermodulation distortion signals. For example, a transistor BFP420 manufactured by Giemens operates in a low noise condition when Vce=2V and Ic=5 mA (where Vce is a bias voltage between collector and emitter, and Ic is collector current). In the meantime, if the reception sensitivity is lowered, the receiver increases the operating voltage and current to Vce=3.2V and Ic=20 mA. Then, the third harmonic intermodulation distortion level will be decreased by about 20 dB, as shown in FIG. 12.

Figure 5:
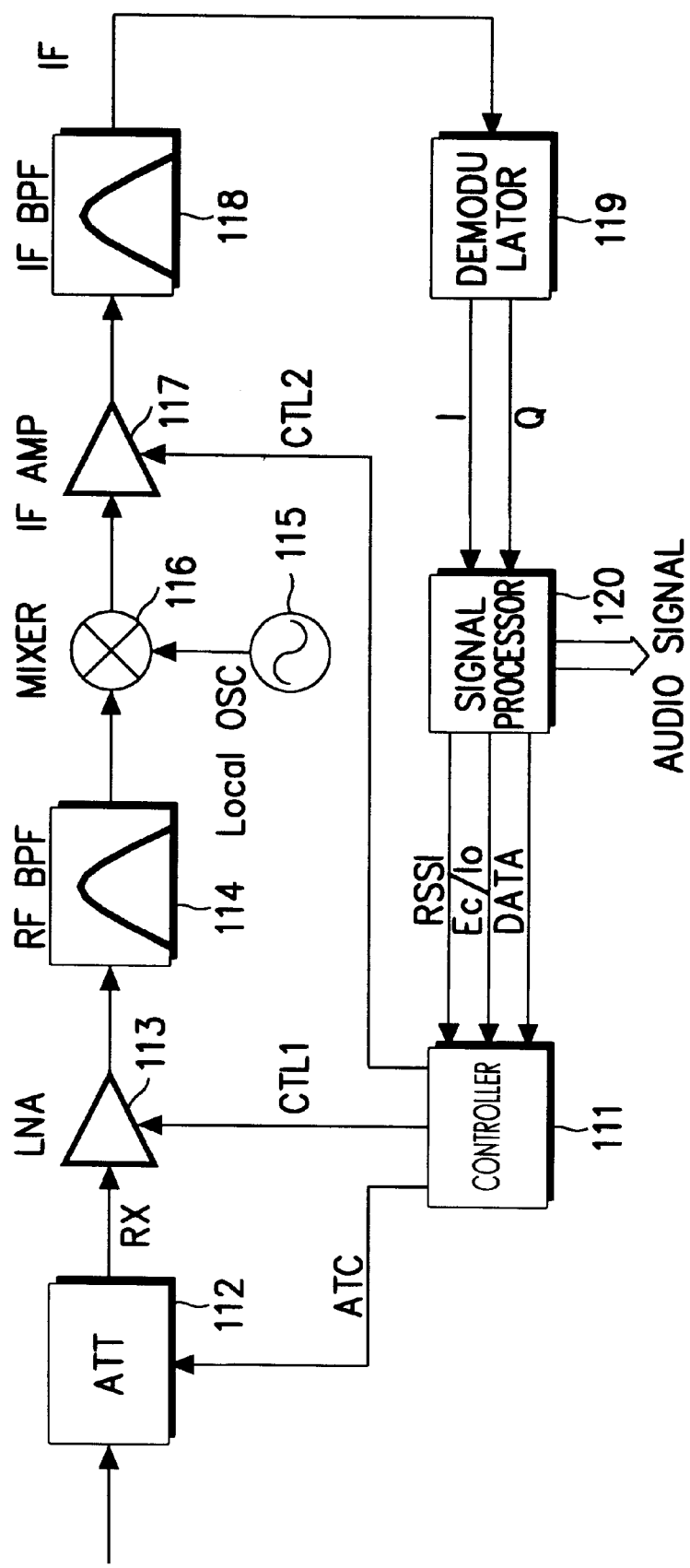
FIG. 5 is a block diagram of a receiver for a radio communication system, capable of suppressing the intermodulation distortion signals, according to a first embodiment of the present invention.

FIG. 5 shows a block diagram of a receiver for a radio communication terminal according to a first embodiment of the present invention. In the drawing, an attenuator 112 attenuates an RF signal received via an antenna (not shown) according to an attenuation control signal ACT output from a controller 111. A low noise amplifier 113 whose operating voltage and current are variable according to a first control signal CTL1, amplifies the weak RF signal output from the attenuator 112. An RF bandpass filter 114 filters the output signal of the low noise amplifier 113 to pass the signal in the reception frequency band only. A mixer 116 mixes the RF signal output from the RF bandpass filter 114 with a local oscillation signal LF output from a local oscillator 115, to generate intermediate frequencies |RF∓LF|. An IF amplifier 117 whose operating voltage and current are variable according to a second control signal CTL2, amplifies the output of the mixer 116. An IF bandpass filter 118 filters the output of the IF amplifier 117 to pass the intermediate frequency |RF−LF| out of the intermediate frequencies |RF∓LF|. The mixer 116 and the IF bandpass filter 118 cooperate to down-convert the RF signal to the IF signal. A demodulator 119 demodulates the IF output signal of the IF bandpass filter 118 to generate I and Q signals. A signal processor 120 processes the I and Q signals output from the demodulator 119 to generate baseband digital data and a baseband audio signal. Further, the signal processor 120 detects and outputs a received signal strength indicator (RSSI) signal and a signal-to-noise (or signal-to-interference) ratio (Ec/Io) signal.

The controller 111 analyzes the RSSI signal and the Ec/Io signal output from the signal processor 120 and generates the attenuation control signal ATC, and the first and second control signals CTL1 and CTL2 for controlling the intermodulation distortion signals. Further, the controller 111 controls the receiver according to the flow chart of FIG. 6.

In the case of the CDMA cellular phone, the receiver measures and calculates the RSSI and Ec/Io signals for the received signal in the baseband. Here, the RSSI signal indicates the strength of the whole received signals including the noise signal (or the interference signal). Therefore, when the signal-to-noise ratio Ec/Io is lower even though the RSSI is higher, the noise is greater than the signal. In this case, the controller 111 generates the control signals CTL1 and CTL2. In other words, if the RSSI is lower than a predetermined value (i.e., a reference RSSI), or if the signal-to-noise ratio Ec/Io is lower than a predetermined value (i.e., a reference Ec/Io) even though the RSSI is higher than the reference RSSI, the controller 111 generates the control signals CTL1 and CTL2, judging that the reception sensitivity is lower. In particular, when the signal-to-noise ratio Ec/Io is lower than the reference Ec/Io although the RSSI is higher than the reference RSSI, the controller 111 generates the control signals CTL1 and CTL2, judging that the noise signal level is higher than the signal level. The controller 111 stores the reference RSSI value and the reference Ec/Io value where the receiver can maintain the high reception sensitivity.

Figure 6:
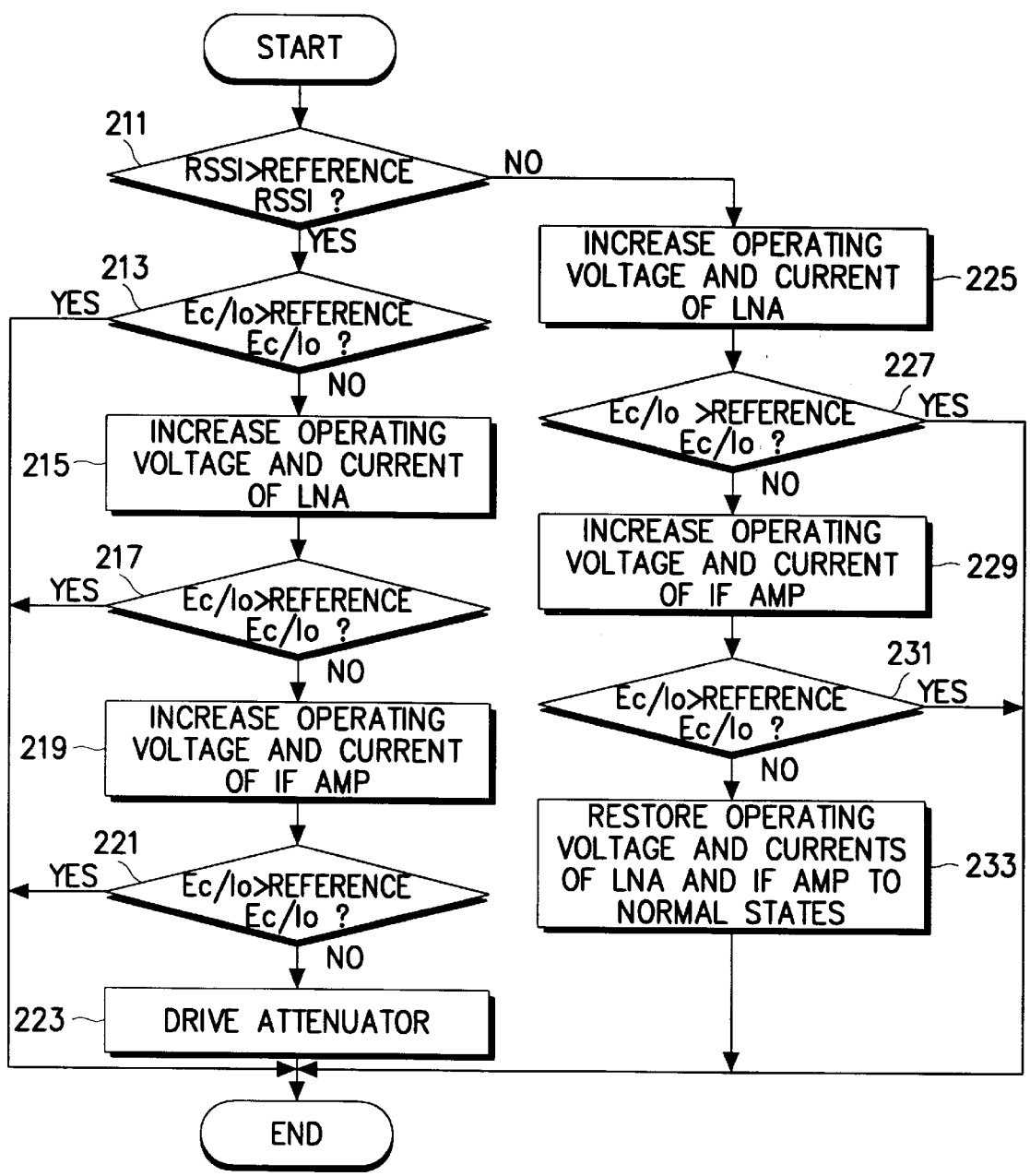
FIG. 6 is a flow chart for suppressing the intermodulation distortion signals according to the first embodiment of the present invention.

Referring to FIG. 6, upon receipt of the RSSI signal and Ec/Io signal from the signal processor 120, the controller 111 compares in step 211 the RSSI signal with the reference RSSI signal to determine whether the RSSI signal is greater than the reference RSSI signal. If the RSSI signal is not greater than the reference RSSI signal, the controller 111 activates the first control signal CTL1 in step 225, to increase the operating voltage and current of the low noise amplifier 113. Consecutively, the controller 111 compares in step 227 the Ec/Io signal with the reference Ec/Io signal to determine whether the Ec/Io signal is greater than the reference Ec/Io signal. If so, the controller 111 ends the procedure, judging that the reception sensitivity is enhanced. However, if the Ec/Io signal is not greater than the reference Ec/Io signal, the controller 111, judging that the reception sensitivity is still poor, activates the second control signal CTL2 in step 229, to increase the operating voltage and current of the IF amplifier 117. Thereafter, in step 231, the controller 111 determines again whether the Ec/Io signal is greater than the reference Ec/Io signal. Accordingly, if the Ec/Io signal is greater than the reference Ec/Io signal, the controller 111 ends the procedure, and otherwise, if the Ec/Io signal is not greater than the reference Ec/Io signal, the controller 111 inactivates the first and second control signals CTL1 and CTL2 to restore the operating voltages and currents of the low noise amplifier 113 and the IF amplifier 117 to the original normal states.

To sum up, if the RSSI signal is not greater than the reference RSSI signal, the reception sensitivity is lowered. Then, the controller 111 performs the steps 225–233 to increase the operating voltages and currents of the low noise amplifier 113 and the IF amplifier 117, so as to increase their gains. For all that, if the reception sensitivity is still poor, the controller 111 restores the operating voltages and currents of the low noise amplifier 113 and the IF amplifier 117 to the original states and then, ends the procedure.

Referring again to the step 211, if the received RSSI signal is greater than the reference RSSI signal, the controller 111 determines in step 213 whether the Ec/Io signal is greater than the reference Ec/Io signal. If so, the controller 111, judging that the reception sensitivity is high, ends the procedure. However, if the Ec/Io signal is not greater than the reference Ec/Io signal, the controller 111 activates the first control signal CTL1 in step 215, to increase the operating voltage and current of the low noise amplifier 113. Then, in step 217, the controller 111 again determines whether the Ec/Io signal is greater than the reference Ec/Io signal. At the result, if the Ec/Io signal is greater than the reference Ec/Io signal, the controller 111 ends the procedure. However, if the Ec/Io signal is not greater than the reference Ec/Io signal, the controller 111 activates the second control signal CTL2 in step 219, to increase the operating voltage and current of the IF amplifier 117. Consequently, in step 221, the controller 111 checks again whether the Ec/Io signal is greater than the reference Ec/Io signal. In result, if the Ec/Io signal is greater than the reference Ec/Io signal in step 221, the controller 111 ends the procedure, and otherwise, activates the attenuation control signal ATC to cause the attenuator 112 to attenuate the received RF signal in step 223.

To sum up, if the RSSI signal is greater than the reference RSSI signal so that the intermodulation distortion signal affects the reception sensitivity, the receiver of the invention increases the operating voltages and currents of the low noise amplifier 113 and the IF amplifier 117 in sequence, if the Ec/Io signal is not greater than the reference Ec/Io signal. For all that, if the Ec/Io signal is still not greater than the reference Ec/Io signal, the receiver causes the attenuator 112 to attenuate the received RF signal.

As described above, if the reception sensitivity is deteriorated due to the third harmonic intermodulation distortion signal, the receiver of the invention first increases the operating voltage and current of the low noise amplifier 113 to reduce the third harmonic intermodulation distortion components in strength, and then, increases the operating voltage and current of the IF amplifier 117 to further reduce the third harmonic intermodulation distortion signals in strength.

Figure 7:
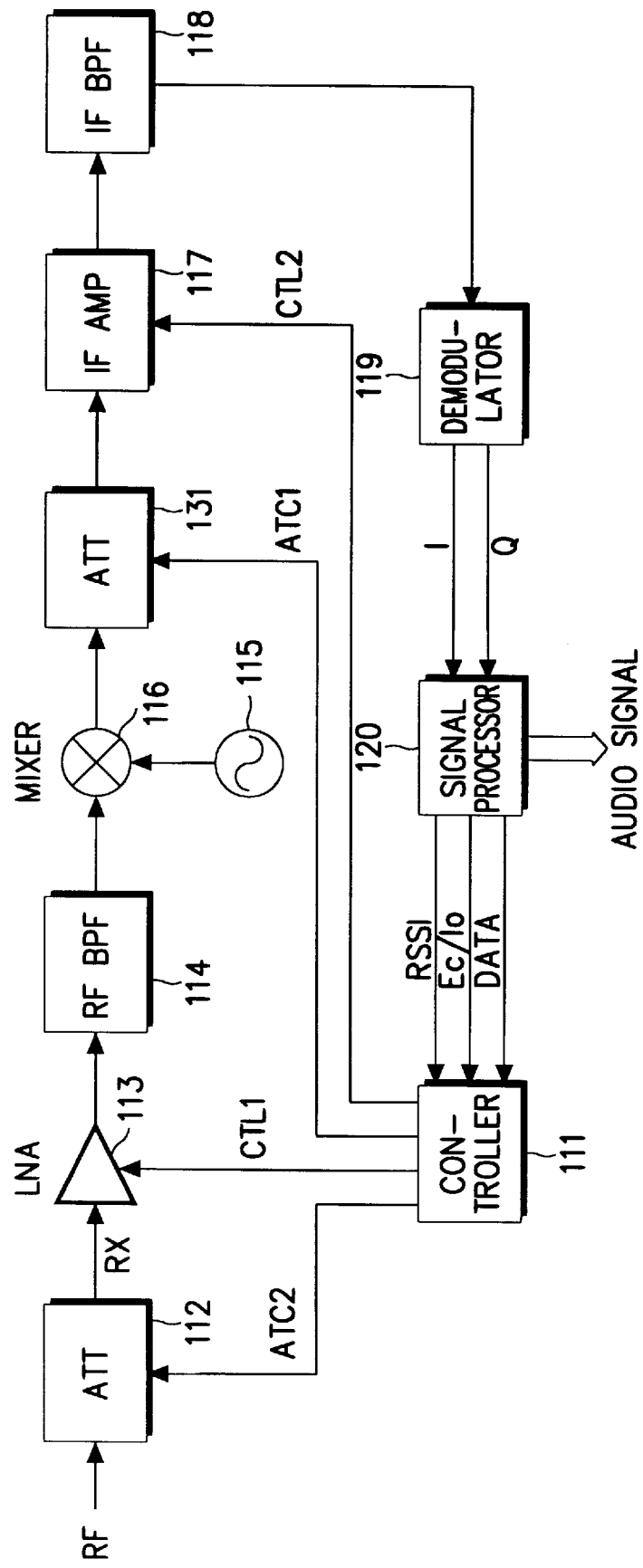
FIG. 7 is a block diagram of a receiver for a radio communication system, capable of suppressing the intermodulation distortion signals, according to a second embodiment of the present invention.

FIG. 7 shows a block diagram of a receiver with suppressed intermodulation distortion according to a second embodiment of the present invention. It is noted that the receiver is similar to that of FIG. 5 except that it has an attenuator 131 interposed between the mixer 116 and the IF amplifier 117 and the controller 111 generates attenuation control signals ATC1 and ACT2 for the attenuators 131 and 112, respectively. The receiver according to the second embodiment of the present invention operates in the similar manner as the receiver of FIG. 5. Thus, the detailed description will be avoided herein.

Figure 8:
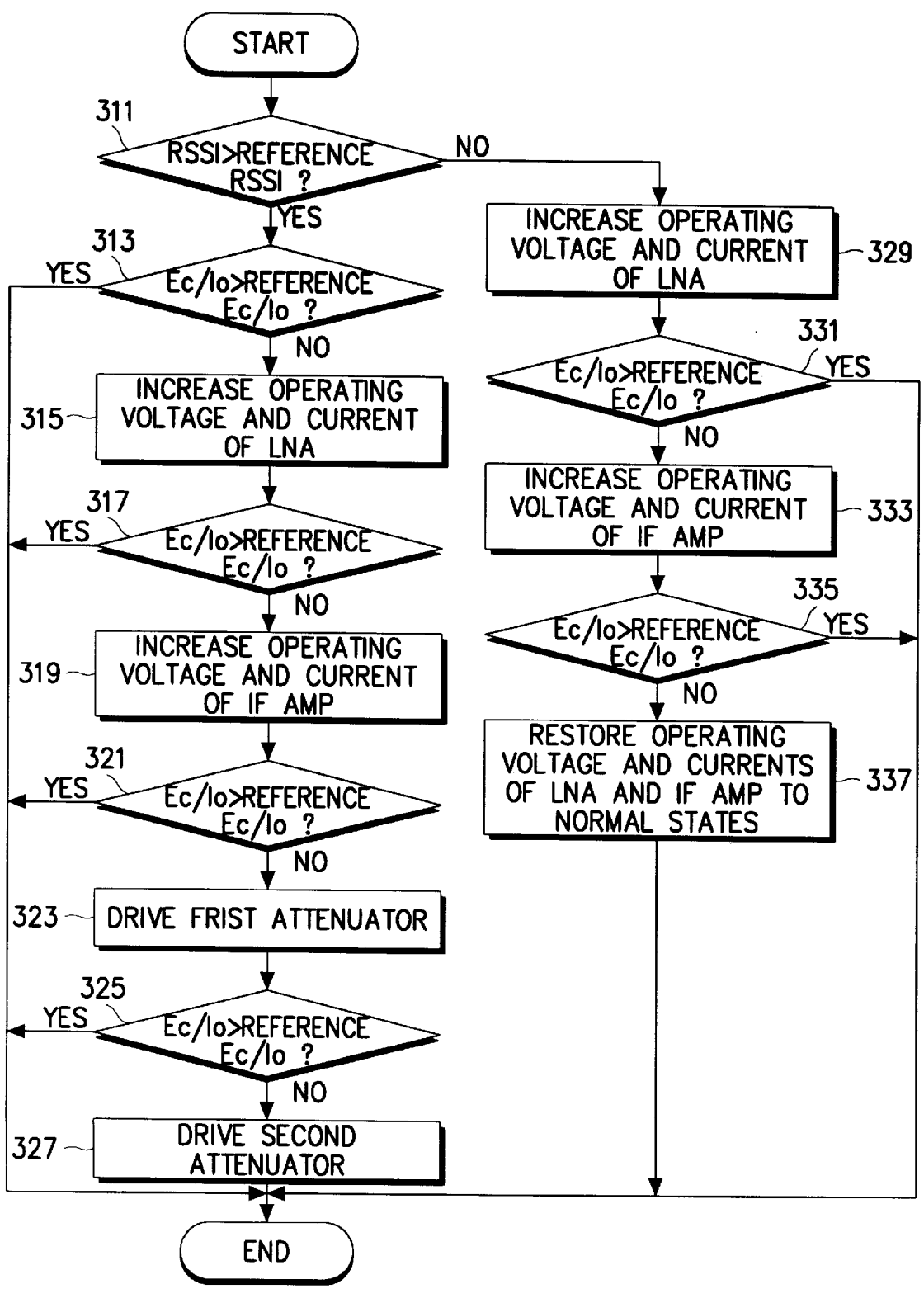
FIG. 8 is a flow chart for suppressing the intermodulation distortion signals according to the second embodiment of the present invention.

FIG. 8 shows a flow chart for suppressing the intermodulation distortion signals according to the second embodiment of the present invention. Referring to FIG. 8, if the RSSI signal is not greater than the reference RSSI signal, the controller 111 performs steps 329–337 which correspond to the steps 225–233 of FIG. 6. However, if the RSSI signal is greater than the reference RSSI signal and the Ec/Io signal is not greater than the reference Ec/Io signal in steps 313, 317, 321 or 325, the controller 111 respectively activates the first control signal CTL1 to increase the operating voltage and current of the low noise amplifier 113 in step 315, activates the second control signal CTL2 to increase the operating voltage and current of the IF amplifier 117 in step 319, activates attenuation control signal ATC1 to enable the attenuator 131 to attenuate the output of the mixer 116 in step 323, and activates attenuation control signal ATC2 to enable the attenuator 112 to attenuates the received RF signal in step 327, in the sequence shown in FIG. 8. That is, the controller 111 sequentially controls the low noise amplifier 113, the IF amplifier 117, the attenuator 13 1, and the attenuator 112 to eliminate the intermodulation distortion signal from the received RF signal.

Figure 9:
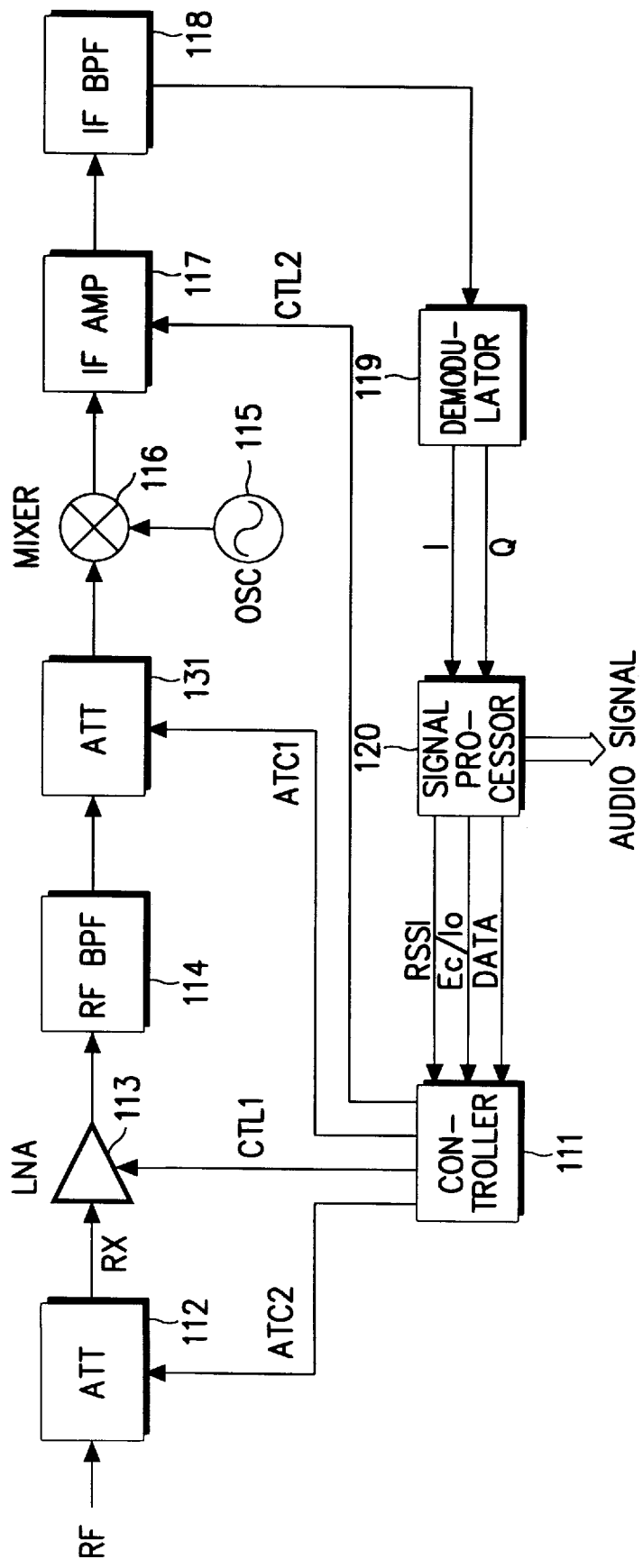
FIG. 9 is a block diagram of a receiver for a radio communication system, capable of suppressing the intermodulation distortion signals, according to a third embodiment of the present invention.

FIG. 9 shows a block diagram of a receiver with suppressed intermodulation distortion according to a third embodiment of the present invention. It is noted that the receiver is similar to that of FIG. 7 except that the attenuator 131 is now interposed between the RF bandpass filter 114 and the mixer 116. The receiver according to the third embodiment of the present invention operates in the similar manner as the receiver of FIG. 7. Thus, the detailed description will be avoided herein.

Figure 10:
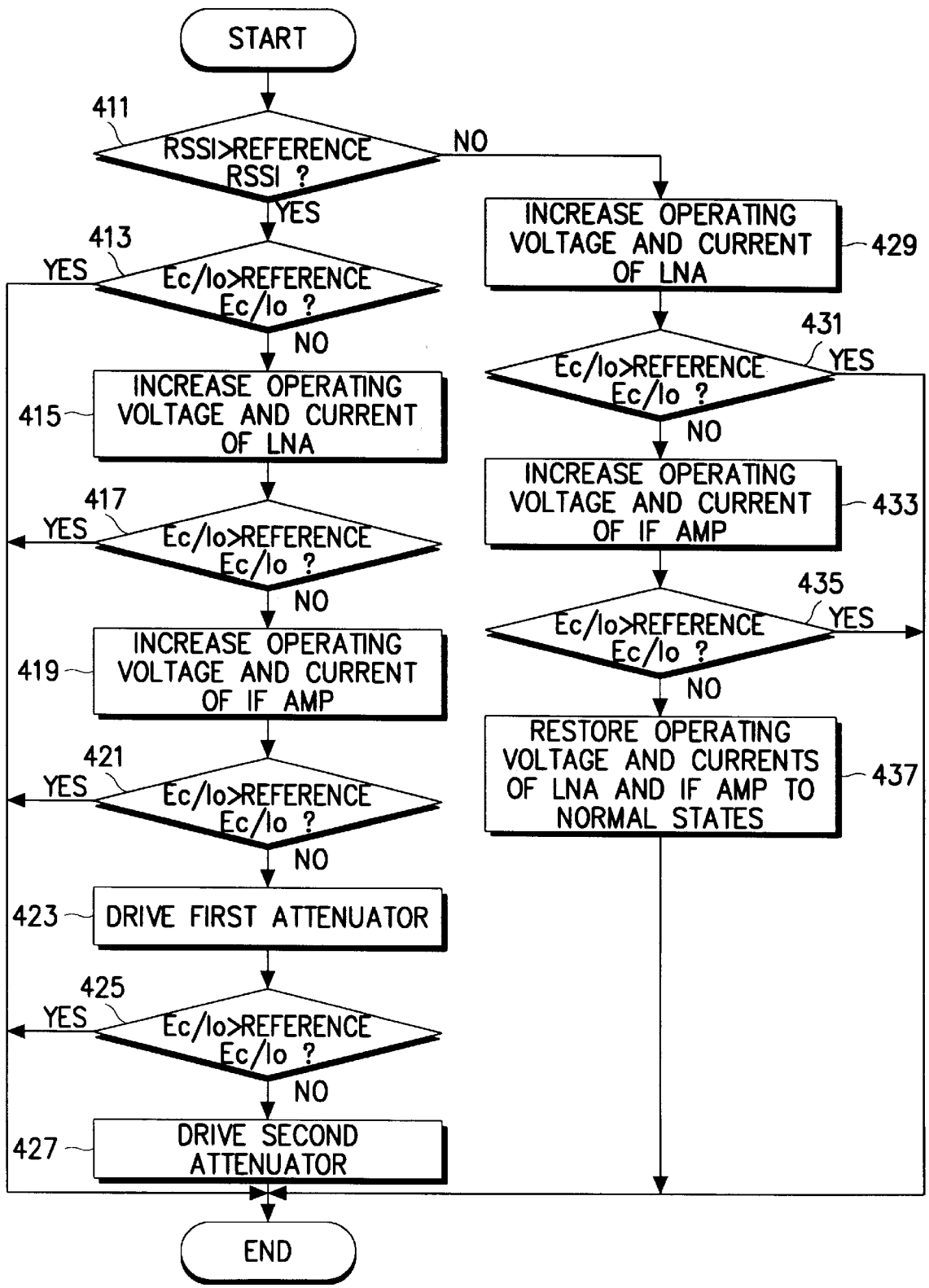
FIG. 10 is a flow chart for suppressing the intermodulation distortion signals according to the third embodiment of the present invention.

FIG. 10 shows a flow chart for suppressing the intermodulation distortion signals according to the third embodiment of the present invention. Referring to FIG. 10, if the RSSI signal is not greater than the reference RSSI signal, the controller 111 performs steps 429–437 which correspond to the steps 329–337 of FIG. 8 and steps 225–233 of FIG. 6. However, if the RSSI signal is greater than the reference RSSI signal and the Ec/Io signal is not greater than the reference Ec/Io signal, in steps 413, 417, 421 or 425, the controller 111 respectively activates the first control signal CTL1 to increase the operating voltage and current of the low noise amplifier 113 in step 415, activates the second control signal CTL2 to increase the operating voltage and current of the IF amplifier 117 in step 419, activates attenuation control signal ATC1 to enable the attenuator 131 to attenuate the output of the mixer 116 in step 423, and activates attenuation control signal ATC2 to enable the attenuator 112 to attenuates the received RF signal in step 327, in the sequence shown in FIG. 10. That is, the controller 111 sequentially controls the low noise amplifier 113, the IF amplifier 117, the attenuator 131, and the attenuator 112 to eliminate the intermodulation distortion signal from the received RF signal.

As described hereinbefore, the receiver (to be concrete, the signal processor 120) of the invention measures and calculates the RSSI and the Ec/Io for the baseband signals output from the demodulator 119. Here, the RSSI indicates the strength for the whole signals including the noises (i.e., the intermodulation distortion signals). Therefore, if the Ec/Io signal is not greater that the reference Ec/Io signal even though the RSSI signal is greater than the reference RSSI signal, it is meant that the reception sensitivity is deteriorated, i.e., the level of the intermodulation distortion signal is higher than the level of the signal.

In brief, the invention receiver determines whether the RSSI signal is greater than the reference RSSI signal. If the RSSI signal is greater than the reference RSSI signal, the receiver determines whether the Ec/Io signal also is greater than the reference Ec/Io signal. If the Ec/Io signal is greater than the reference Ec/Io signal, the receiver ends the control procedure. However, if the Ec/Io signal is not greater than the reference Ec/Io signal, the receiver increases the operating voltage and current of the low noise amplifier 113 to decrease the intermodulation distortion signal level caused by the low noise amplifier 113. Consecutively, the receiver determines again whether the Ec/Io signal is grater than the reference Ec/Io signal, if the Ec/Io signal is still not greater than the reference Ec/Io signal, the receiver increases the operating voltage and current of the IF amplifier 117 to reduce the intermodulation distortion signal level caused by the IF amplifier 117. After that, the receiver determines again whether the Ec/Io signal is grater than the reference Ec/Io signal, if the Ec/Io signal is still not greater than the reference Ec/Io signal, the receiver controls in sequence the attenuators 131 and 112 to attenuate the signals input thereto. Here, the attenuators 131 and 112 are used as a last resort in reducing the level of the intermodulation distortion signal, so that the reception sensitivity can be enhanced with minimized attenuation of the signal. As can be appreciated from the foregoing description, the receiver according to the first embodiment has the single attenuator 112 connected to the input of the low noise amplifier 113, the receiver according to the second embodiment further includes the attenuator 131 connected to the output of the mixer 116, and the receiver according to the third embodiment includes the attenuator 131 connected to the input of the mixer 116. As to the attenuators, if the Ec/Io signal is not greater than the reference Ec/Io signal, the attenuator 131 is first driven to attenuate the signal input thereto. For all that, if the Ec/Io signal is still not greater than the reference Ec/Io signal, the attenuator 112 is then driven to attenuate the received RF signal.

In addition, if the RSSI signal is not greater than the reference RSSI signal, it is meant that the strength of the received signal is very low and thus, the reception sensitivity is poor. In this case, the invention receiver sequentially increases the operating voltages and currents of the low noise amplifier 113 and the IF amplifier 117, to increase their gains. Notwithstanding, if the reception sensitivity is still low, the receiver restores the operating voltages and currents of the low noise amplifier 113 and the IF amplifier 117 to the original states, and ends the control procedure.

Although the case is described that the receiver sequentially increases the operating voltages and currents of the low noise amplifier 113 and the IF amplifier 117, it can be understood that the receiver can sequentially increase the operating voltages and currents of the IF amplifier 117 and the low noise amplifier 113. Alternatively, the receiver may simultaneously increase the operating voltages of the currents of the low noise amplifier 113 and the IF amplifier 117.

In the light of the foregoing, if the reception sensitivity is lowered due to the intermodulation distortion signals, the receiver of the invention controls in sequence the low noise amplifier, the IF amplifier, and the attenuators, thereby suppressing the intermodulation distortion signals, so that the reception sensitivity may be enhanced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A receiver with suppressed intermodulation distortion for a radio communication terminal, comprising:
    a low noise amplifier for amplifying a received radio frequency signal, an operating power thereof being increased to reduce an intermodulation distortion signal in response to a first control signal;
    a radio frequency bandpass filter for bandpass-filtering signals in a reception frequency band out of the signals output from the low noise amplifier;
    a mixer for mixing an output of the radio frequency bandpass filter with a local oscillation signal to generate an intermediate frequency signal by down-converting the output of the radio frequency bandpass filter;
    an intermediate frequency amplifier for amplifying the intermediate frequency signal output from the mixer, an operating power thereof being increased to reduce the intermodulation distortion signal in response to a second control signal;
    an intermediate frequency bandpass filter for bandpass-filtering an intermediate frequency signal out of the signals output from the intermediate frequency amplifier;
    a demodulator and signal processor for demodulating and processing the intermediate frequency signal output from the intermediate frequency bandpass filter to generate a received signal strength indicator (RSSI) signal and a signal-to-noise ratio signal; and
    a controller having a reference RSSI signal and a reference signal-to-noise ratio signal stored therein, for comparing the RSSI signal and the signal-to-noise ratio signal with the reference RSSI signal and the reference signal-to-noise ratio signal to determine whether a reception sensitivity is poor, and generates in sequence said first and second control signals if the reception sensitivity is poor.

2. The receiver as claimed in claim 1, wherein said controller determines that the reception sensitivity is poor when the signal-to-noise ratio signal is not greater than the reference signal-to-noise ratio signal, and generates in sequence the first and second control signals.

3. The receiver as claimed in claim 1, further comprising a variable attenuator connected to an input of said low noise amplifier, said radio frequency signal being input to said low noise amplifier via said variable attenuator; and
    said controller generating an attenuation control signal for controlling said variable attenuator when it is determined that the signal-to-noise ratio signal is still not greater than the reference signal-to-noise ratio signal following the generation of said second control signal.

4. A method for suppressing an intermodulation distortion signal of a receiver receiving a radio frequency signal via an antenna, said method comprising steps of:
    sequentially increasing an operating voltage and current of a low noise amplifier based on analysis of a received signal strength indicator signal and an operating voltage and current of an intermediate frequency amplifier based on analysis of a signal-to-noise ratio signal to reduce the intermodulation distortion signal when a reception sensitivity is poor; and
    returning said operating voltages and currents of the low noise amplifier and the intermediate frequency amplifier to normal operating voltages and currents when the reception sensitivity is enhanced.

5. The method as set forth in claim 4, said step of sequentially increasing an operating voltage and current of a low noise amplifier and an operating voltage and current of an intermediate frequency amplifier comprises steps of:
    comparing the received signal strength indicator signal with a reference received signal strength indicator signal to determine whether the received signal strength indicator signal is greater than the reference received signal strength indicator signal;
    activating a first control signal to increase the operating voltage and current of the low noise amplifier when the received signal strength indicator signal is not greater than the reference received signal strength indicator signal;
    comparing the signal-to-noise ratio signal with a reference signal-to-noise ratio signal to determine whether the signal-to-noise ratio signal is greater than the reference signal-to-noise ratio signal;
    activating a second control signal to increase the operating voltage and current of the intermediate frequency amplifier when it is determined that the signal-to-noise ratio signal is not greater than the reference signal-to-noise ratio signal;
    determining again whether the signal-to-noise ratio signal is greater than the reference signal-to-noise ratio signal and performing said step of returning said operating voltages and currents of the low noise amplifier and said operating voltages and currents of the intermediate frequency amplifier to normal operating voltages and currents when it is determined again that the signal-to-noise ratio signal is not greater than the reference signal-to-noise ratio signal.

6. The method as set forth in claim 4, said step of sequentially increasing operating voltage and current of a low noise amplifier and increasing operating voltage and current of an intermediate frequency amplifier comprises steps of:
    comparing the received signal strength indicator signal with a reference received signal strength indicator signal to determine whether the received signal strength indicator signal is greater than the reference received signal strength indicator signal;
    comparing the signal-to-noise ratio signal with a reference signal-to-noise ratio signal to determine whether the signal-to-noise ratio signal is greater than the reference signal-to-noise ratio signal, when it is determined that the received signal strength indicator signal is greater than the reference received signal strength indicator signal;

activating a first control signal to increase the operating voltage and current of the low noise amplifier, when it is determined that the signal-to-noise ratio signal is not greater than the reference signal-to-noise ratio signal;

determining again whether the signal-to-noise ratio signal is greater than the reference signal-to-noise ratio signal; and activating a second control signal to increase the operating voltage and current of the intermediate frequency amplifier, when it is determined again that the signal-to-noise ratio signal is not greater than the reference signal-to-noise ratio signal.

7. The method as set forth in claim 6, further comprising steps of:

determining yet again whether the signal-to-noise ratio signal is greater than the reference signal-to-noise ratio signal; and generating an attenuation control signal to control a variable attenuator to attenuate said radio frequency signal, when it is determined yet again that the signal-to-noise ratio signal is not greater than the reference signal-to-noise ratio signal.

8. The method as set forth in claim 6, further comprising steps of:

determining yet again whether the signal-to-noise ratio signal is greater than the reference signal-to-noise ratio signal;

generating a first attenuation control signal to control a first variable attenuator disposed between a mixer and said intermediate frequency amplifier to attenuate an intermediate frequency signal output from said mixer, when it is determined yet again that the signal-to-noise ratio signal is not greater than the reference signal-to-noise ratio signal;

determining further whether the signal-to-noise ratio signal is greater than the reference signal-to-noise ratio signal; and generating a second attenuation control signal to control second variable attenuator to attenuate said received radio frequency signal, when it is determined further that the signal-to-noise ratio signal is not greater than the reference signal-to-noise ratio signal.

9. The method as set forth in claim 6, further comprising steps of:

determining yet again whether the signal-to-noise ratio signal is greater than the reference signal-to-noise ratio signal;

generating a first attenuation control signal to control a first variable attenuator, disposed between said low noise amplifier and a mixer of a down converter including said intermediate frequency amplifier, to attenuate a bandpass filtered radio frequency signal output from a radio frequency bandpass filter disposed between said low noise amplifier and said first variable attenuator, when it is determined yet again that the signal-to-noise ratio signal is not greater than the reference signal-to-noise ratio signal;

determining further whether the signal-to-noise ratio signal is greater than the reference signal-to-noise ratio signal; and generating a second attenuation control signal to control a second variable attenuator to attenuate said received radio frequency signal, when it is determined further that the signal-to-noise ratio signal is not greater than the reference signal-to-noise ratio signal.

10. A receiver with suppressed intermodulation distortion for a radio communication terminal comprising first and second variable attenuators, a low noise amplifier, a radio frequency bandpass filter, a mixer, a local oscillator, an intermediate frequency amplifier and an intermediate frequency bandpass filter, said receiver further comprising:

a demodulator for demodulating an intermediate frequency passed by said intermediate bandpass filter;

a signal processor for generating a received signal strength indicator signal and a signal-to-noise ratio signal in response to a demodulated signal output from said demodulator;

a controller for comparing said received signal strength indicator signal to a reference received signal strength indicator signal and for comparing said signal-to-noise ratio signal to a reference signal-to-noise ratio signal;

said controller generating a first control signal to increase an operating voltage and current of the low noise amplifier to reduce an intermodulation distortion signal, when the received signal strength indicator signal is not greater than the reference received signal strength indicator signal, said low noise amplifier being disposed between said second variable attenuator and said radio frequency bandpass filter;

said controller comparing the signal-to-noise ratio signal with a reference signal-to-noise ratio signal to determine whether the signal-to-noise ratio signal is greater than the reference signal-to-noise ratio signal, after generating a first control signal;

said controller generating a second control signal to increase an operating voltage and current of the intermediate frequency amplifier to reduce said intermodulation distortion signal, when it is determined that the signal-to-noise ratio signal is not greater than the reference signal-to-noise ratio signal;

said controller determining again whether the signal-to-noise ratio signal is greater than the reference signal-to-noise ratio signal and returning the operating voltages and currents of the low noise amplifier and the intermediate frequency amplifier to normal operating voltages and currents when it is determined again that the signal-to-noise ratio signal is not greater than the reference signal-to-noise ratio signal.

11. The receiver as set forth in claim 10, further comprising:

said controller comparing said signal-to-noise ratio signal with said reference signal-to-noise ratio signal to determine whether the signal-to-noise ratio signal is greater than the reference signal-to-noise ratio signal, when it is determined that the received signal strength indicator signal is greater than the reference received signal strength indicator signal;

said controller generating said first control signal to increase the operating voltage and current of the low noise amplifier, when it is determined that the signal-to-noise ratio signal is not greater than the reference signal-to-noise ratio signal after determining that the received signal strength indicator signal is greater than the reference received signal strength indicator signal;

said controller comparing said signal-to-noise ratio signal with said reference signal-to-noise ratio signal to again determine whether the signal-to-noise ratio signal is greater than the reference signal-to-noise ratio signal and activating said second control signal to increase the operating voltage and current of the intermediate frequency amplifier, when it is again determined that the signal-to-noise ratio signal is not greater than the reference signal-to-noise ratio signal, wherein said intermediate frequency amplifier is disposed between said first variable attenuator and said intermediate frequency bandpass filter.

12. The receiver as set forth in claim 10, further comprising:

said controller comparing said signal-to-noise ratio signal with said reference signal-to-noise ratio signal to determine whether the signal-to-noise ratio signal is greater than the reference signal-to-noise ratio signal, when it is determined that the received signal strength indicator signal is greater than the reference received signal strength indicator signal;

said controller generating said first control signal to increase the operating voltage and current of the low noise amplifier, when it is determined that the signal-to-noise ratio signal is not greater than the reference signal-to-noise ratio signal after determining that the received signal strength indicator signal is greater than the reference received signal strength indicator signal;

said controller comparing said signal-to-noise ratio signal with said reference signal-to-noise ratio signal to again determine whether the signal-to-noise ratio signal is greater than the reference signal-to-noise ratio signal and activating said second control signal to increase the operating voltage and current of the intermediate frequency amplifier, when it is determined again that the signal-to-noise ratio signal is not greater than the reference signal-to-noise ratio signal, wherein said intermediate frequency amplifier is disposed between said mixer and said intermediate frequency bandpass filter.

13. The receiver as set forth in claim 11, further comprising:

said controller determining yet again whether the signal-to-noise ratio signal is greater than the reference signal-to-noise ratio signal; and said controller generating a first attenuation control signal to control said first variable attenuator, said first variable attenuator being disposed between said mixer and said intermediate frequency amplifier, to attenuate an intermediate frequency signal output from said mixer, when it is determined yet again that the signal-to-noise ratio signal is not greater than the reference signal-to-noise ratio signal.

14. The receiver as set forth in claim 12, further comprising:

said controller determining yet again whether the signal-to-noise ratio signal is greater than the reference signal-to-noise ratio signal; and said controller generating a first attenuation control signal to control said first variable attenuator, said first variable attenuator being disposed between radio frequency bandpass filter and said mixer, to attenuate a radio frequency signal bandpassed by said radio frequency bandpass filter, when it is determined yet again that the signal-to-noise ratio signal is not greater than the reference signal-to-noise ratio signal.

15. The receiver as set forth in claim 13, further comprising:

said controller determining further whether the signal-to-noise ratio signal is greater than the reference signal-to-noise ratio signal; and said controller generating a second attenuation control signal to control said second variable attenuator to attenuate said received radio frequency signal, when it is determined further that the signal-to-noise ratio signal is not greater than the reference signal-to-noise ratio signal.

16. The receiver as set forth in claim 14, further comprising:

said controller determining further whether the signal-to-noise ratio signal is greater than the reference signal-to-noise ratio signal; and said controller generating a second attenuation control signal to control said second variable attenuator to attenuate said received radio frequency signal, when it is determined further that the signal-to-noise ratio signal is not greater than the reference signal-to-noise ratio signal.

17. The receiver as set forth in claim 11, further comprising:

said controller determining yet again whether the signal-to-noise ratio signal is greater than the reference signal-to-noise ratio signal; and said controller generating a first attenuation control signal to control said first variable attenuator, said first variable attenuator being disposed between said mixer and said intermediate frequency amplifier, to attenuate an intermediate frequency signal output from said mixer, when it is yet again determined that the signal-to-noise ratio signal is not greater than the reference signal-to-noise ratio signal;

said controller determining further whether the signal-to-noise ratio signal is greater than the reference signal-to-noise ratio signal; and said controller generating a second attenuation control signal to control said second variable attenuator to attenuate said received radio frequency signal, when it is determined further that the signal-to-noise ratio signal is not greater than the reference signal-to-noise ratio signal.

18. The receiver as set forth in claim 12, further comprising:

said controller determining yet again whether the signal-to-noise ratio signal is greater than the reference signal-to-noise ratio signal; and said controller generating a first attenuation control signal to control said first variable attenuator, said first variable attenuator being disposed between radio frequency bandpass filter and said mixer, to attenuate a radio frequency signal bandpassed by said radio frequency bandpass filter, when it is yet again determined that the signal-to-noise ratio signal is not greater than the reference signal-to-noise ratio signal;

said controller determining further whether the signal-to-noise ratio signal is greater than the reference signal-to-noise ratio signal; and said controller generating a second attenuation control signal to control said second variable attenuator to attenuate said received radio frequency signal, when it is determined further that the signal-to-noise ratio signal is not greater than the reference signal-to-noise ratio signal.

* * * * *